(12) United States Patent
Yeom

(10) Patent No.: US 10,399,395 B2
(45) Date of Patent: Sep. 3, 2019

(54) VEHICLE AND METHOD FOR CONTROLLING THE SAME

(71) Applicants: Hyundai Motor Company, Seoul (KR); Kia Motors Corporation, Seoul (KR)

(72) Inventor: Myungki Yeom, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 182 days.

(21) Appl. No.: 15/608,133

(22) Filed: May 30, 2017

(65) Prior Publication Data

US 2018/0141394 A1 May 24, 2018

(30) Foreign Application Priority Data

Nov. 24, 2016 (KR) .................. 10-2016-0157273

(51) Int. Cl.
*B60C 23/06* (2006.01)
*B60C 23/04* (2006.01)
*G01M 17/02* (2006.01)

(52) U.S. Cl.
CPC ........ *B60C 23/062* (2013.01); *B60C 23/0413* (2013.01); *G01M 17/025* (2013.01); *B60C 23/061* (2013.01)

(58) Field of Classification Search
None
See application file for complete search history.

(56) References Cited

U.S. PATENT DOCUMENTS

| 6,092,028 | A | 7/2000 | Naito et al. |
| 6,591,668 | B1 * | 7/2003 | Becherer ................. B60C 23/06 73/146 |
| 6,644,108 | B2 | 11/2003 | Inoue |
| 6,711,508 | B2 * | 3/2004 | Kamiya ............... B60C 23/061 702/50 |
| 6,993,449 | B2 | 1/2006 | Koebe et al. |
| 7,205,886 | B2 * | 4/2007 | Kin ...................... B60C 23/061 340/442 |
| 8,554,498 | B2 * | 10/2013 | Gustavsson ........... B60C 23/062 702/50 |

(Continued)

FOREIGN PATENT DOCUMENTS

| JP | 2001-091390 A | 4/2001 |
| JP | 2005-008039 A | 1/2005 |

(Continued)

*Primary Examiner* — Peter J Macchiarolo
*Assistant Examiner* — Jermaine L Jenkins
(74) *Attorney, Agent, or Firm* — Mintz Levin Cohn Ferris Glovsky and Popeo, P.C.; Peter F. Corless

(57) ABSTRACT

A vehicle and method for controlling the same are provided to provide more reliable tire pressure information than the existing tire pressure detecting system using a method of calculating a wheel frequency once every predetermined reference vibration count. The vehicle includes a sensor unit that measures a wheel speed and a controller that divides a vibration count of wheel derived based on the wheel speed by a predetermined reference vibration count to calculate at least one frequency. The at least one frequency is analyzed to derive a state of pressure of a tire mounted on the wheel, and the tire pressure state to be output is adjusted to then be output.

16 Claims, 17 Drawing Sheets

(56) References Cited

U.S. PATENT DOCUMENTS

| | | | |
|---|---|---|---|
| 8,573,045 B2 | 11/2013 | Gotschlich | |
| 8,948,967 B2 * | 2/2015 | Championnet | ........... G01P 3/44 |
| | | | 116/34 R |
| 9,134,194 B2 * | 9/2015 | Wada | ....................... G01L 27/00 |

FOREIGN PATENT DOCUMENTS

| KR | 10-2010-0097993 A | 9/2010 |
|---|---|---|
| KR | 10-1373151 B1 | 3/2014 |

* cited by examiner

VEHICLE AND METHOD FOR CONTROLLING THE SAME

CROSS-REFERENCE TO RELATED APPLICATION

This application claims priority to and the benefit of Korean Patent Application No. 10-2016-0157273, filed on Nov. 24, 2016, the disclosures of which is incorporated herein by reference in its entirety.

BACKGROUND

1. Field of the Invention

The present disclosure relates to a vehicle and method for controlling the same to measure the tire pressure, and more particularly, to a vehicle and control method that improve tire pressure measurement by calculating a wheel frequency once every predetermined reference vibration count.

2. Discussion of Related Art

A tire pressure monitoring system (TPMS) is a system that checks the tire pressure in real time using a sensor and provides the information to the driver via a display installed on the dashboard. The TPMS has advantages of upgraded stability, such as prevention of sudden blowout of a tire, improved braking ability, improved driving performance, etc., increased driving convenience, such as smoother ride, improved steering performance, noise reduction, etc., and improved economical efficiency, such as tire life extension and improved fuel efficiency.

Various types of TPMS have been developed included, a direct method for monitoring a change in tire pressure in real time using a sensor directly mounted on the tire, and an indirect method for indirectly measuring the tire pressure by detecting the number of wheel turns using a wheel speed sensor based on the anti-lock braking system (ABS). The indirect method in particular uses a principle that the number of turns increases as the diameter of the tire decreases when the tire pressure drops below a threshold. Although having an advantage that there is no need to install an additional sensor, the indirect method has disadvantages of having lower accuracy and requiring a substantial amount of calculation compared to the direct method. Research for addressing the disadvantages is actively being conducted for safe and efficient driving of vehicles.

SUMMARY

The present disclosure provides a vehicle and method for controlling the same, to provide more reliable tire pressure information than the existing tire pressure detecting system, by using a method of calculating a wheel frequency once every predetermined reference vibration count.

In accordance with one aspect of the present disclosure, a vehicle may include: a sensor unit configured to measure a wheel speed; a controller configured to divide a vibration count of wheel derived based on the wheel speed by a predetermined reference vibration count to calculate at least one frequency, analyze the at least one frequency to derive a state of pressure of a tire mounted on the wheel, and adjust the tire pressure state to be output; and an output unit configured to output the tire pressure state.

The controller may further be configured to analyze the at least one frequency to determine a representative frequency, and derive the tire pressure state based on the representative frequency. The controller may be configured to analyze the at least one frequency to generate a graph indicating how many times a frequency appears, and derive the tire pressure state based on a peak value in the graph. The controller may also be configured to cancel noise from the wheel speed, extract a vibration count of the wheel in a range of predetermined vibration counts, and derive the tire pressure state based on the extracted vibration count of wheel.

Further, the controller may be configured to transform relations between the derived wheel vibration count and a measurement period of time to relations between the wheel frequency and the number of times the wheel frequency is measured based on the fast Fourier transform. The controller may be configured to collect information regarding frequency based tire pressure states to determine a pattern of wheel frequency based tire pressure states, and derive a tire pressure state that corresponds to the wheel frequency based on the pattern of the tire pressure states. Additionally, the controller may be configured to store the tire pressure state and vehicle speed at which the tire pressure state is derived, which are mapped to the calculated wheel frequency data, in a database, and select and output a tire pressure state that corresponds to a wheel frequency calculated from a wheel speed based on the database.

The database may divide and store tire pressure states and preset speed ranges for the tire pressure states mapped to wheel frequency data. The controller may be configured to operate the output unit to display information regarding pressure states of a plurality of tires of the vehicle. The controller may also be configured to operate the output unit to output a warning signal when the tire pressure state is beyond a predetermined numerical range.

In accordance with one aspect of the present disclosure, a method for controlling a vehicle may include: measuring a wheel speed; dividing a vibration count of wheel derived based on the wheel speed by a predetermined reference vibration count to calculate at least one frequency; analyzing the at least one frequency to derive a pressure state of a tire mounted on the wheel; adjusting the tire pressure state to be output; and outputting the tire pressure state.

The derivation of a pressure state of a tire mounted on the wheel may include analyzing the at least one frequency to determine a representative frequency, and deriving the tire pressure state based on the representative frequency. Additionally, the derivation of a pressure state of a tire mounted on the wheel may include analyzing the at least one frequency to generate a graph indicating how many times a frequency appears, and deriving the tire pressure state based on a peak value in the graph.

The calculating of the frequency may include canceling noise from the wheel speed, extracting a vibration count of the wheel in a range of predetermined vibration counts, and deriving the tire pressure state based on the extracted wheel vibration count. The calculating the frequency may further include transforming relations between the derived wheel vibration count and a measurement period of time to relations between the wheel frequency and the number of times the wheel frequency is measured based on the fast Fourier transform. The derivation of a tire pressure state may include collecting information regarding frequency based tire pressure states to determine a pattern of wheel frequency based tire pressure states, and deriving a tire pressure state that corresponds to the wheel frequency based on the pattern of the tire pressure states.

The method may further include: storing a database having the tire pressure state and vehicle speed at which the tire pressure state is derived, which are mapped to the calculated wheel frequency data. The derivation of a tire pressure state may include selecting and outputting a tire pressure state that corresponds to a wheel frequency calculated from a wheel speed based on the database. The storing of the database may include dividing and storing tire pressure states and preset speed ranges for the tire pressure states mapped to wheel frequency data. The adjustment of the tire pressure state to be output may include adjusting, changing, or updating information regarding the pressure states of a plurality of tires equipped in the vehicle to be displayed. The outputting of the tire pressure state may include operating an output unit to output a warning signal when the tire pressure state is beyond a predetermined numerical range.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
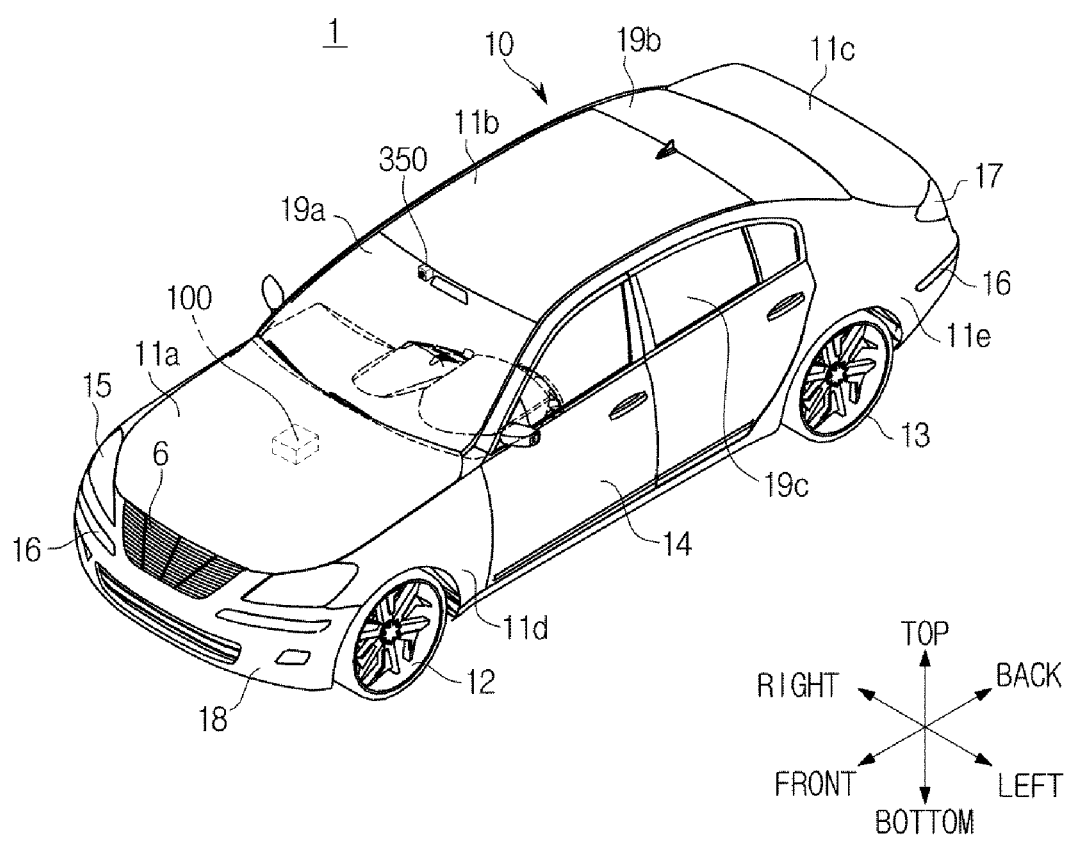
FIG. 1 is a perspective view schematically illustrating the exterior of a vehicle, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements. It will be further understood that the term "connect" or its derivatives refer both to direct and indirect connection unless specifically stated, and the indirect connection includes a connection over a wireless communication network. The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise. The principle and embodiments of the present invention will now be described with reference to accompanying drawings.

FIG. 1 is a perspective view schematically illustrating the exterior of a vehicle, according to an exemplary embodiment of the present disclosure. Referring to FIG. 1, a vehicle 1 may include a car frame 10 that forms the exterior thereof, and wheels 12, 13 for moving the vehicle 1. The car frame 10 may include a hood 11a that protects various components required for driving the vehicle 1, a roof panel 11b that forms an indoor space, a trunk lid 11c of a trunk at the rear of the vehicle, front fenders 11d disposed on the sides of the vehicle 1, and quarter panels 11e. There may be a plurality of doors 15 disposed on the sides of the car frame 10 and hinged with the car frame 10. A front window 19a is disposed between the hood 11a and the roof panel 11b for providing a view ahead of the vehicle 1, and a rear window 19b is disposed between the roof panel 11b and the trunk lid 11c for providing a view behind the vehicle 1. Side windows 19c may also be built into the upper part of the doors 15 to provide side views.

Headlamps 15 may be disposed on the front of the vehicle 1 for illuminating a direction in which the vehicle 1 is moving. Turn signal lamps 16 may also be disposed on the front and back of the vehicle 1 for providing an indication regarding a direction in which the vehicle 1 will turn. The vehicle 1 may control the turn signal lamp 16 to blink to indicate a turning direction. Tail lamps 17 may also be disposed at the rear of the vehicle 1. The tail lamps 17 may indicate a state of gear shift, a state of brake operation of the vehicle 1, etc.

At least one vehicle controller 100 may be included within the vehicle 1. The vehicle controller 100 may have a function to perform electronic control over operation of the vehicle 1. In other words, the vehicle controller 100 may operate various components within the vehicle in order to operate the vehicle itself. The vehicle controller 100 may be installed in any position inside the vehicle 1 according to a designer preference. For example, the vehicle controller 100 may be installed between the engine room and the dashboard, or installed inside of the center fascia. The vehicle controller 100 may include at least one processor configured to receive electric signals, analyze the electric signals, and output results regarding the electric signals. The at least one processor may be implemented with at least one semiconductor chip and associated components. The at least one semiconductor chip and associated components are installed on a printed circuit board (PCB) that may be installed within the vehicle 1.

Figure 2:
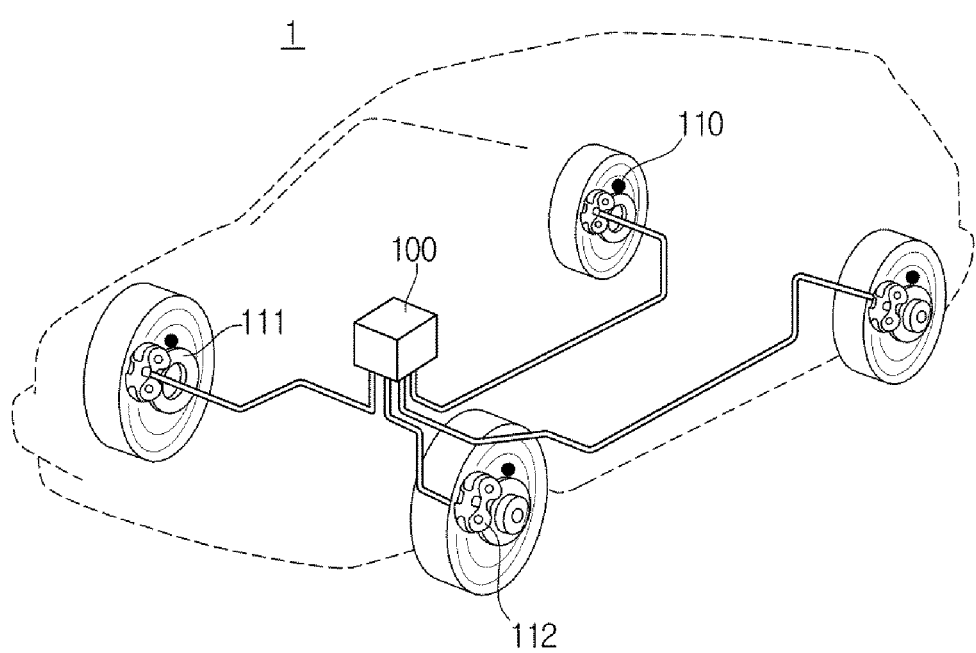
FIG. 2 shows an anti-lock braking system (ABS), according to an exemplary embodiment of the present disclosure.

FIG. 2 shows an anti-lock braking system (ABS), according to an exemplary embodiment of the present disclosure. Particularly, a vehicle may be equipped with an ABS that may include a booster and master cylinder of e.g., a braking system, and a controller 100, a hydraulic control unit (HCU), a sensor unit 110 configured to detect the speed of wheels, a pedal travel switch (PTS) configured to detect a state of engaging the brake, a disc brake 111, and a caliper 112, which are electronic control devices.

The disc brake 111 may compress pads on both sides of a disc rotating with the vehicle wheels and cause friction to obtain braking power. For a closed-type drum brake, it may make up for a defect of a frequently-used drum expanding and not working due to the frictional heat. Main parts of the ABS system may include a disc rotating with a wheel hub, pads adhered closely to the disc to cause friction, a hydraulically operated wheel cylinder, a caliper 112 that accommodates the wheel cylinder, etc.

The caliper 112 is a device for engaging the front wheel brake by sticking the pads of the vehicle closely to the disc brake 111 (e.g., engaging the brake for the pad to contact the disc brake), and is hydraulically operated. While the brake is operating, when the master cylinder receives hydraulic pressure, brake oil in the cylinder generates hydraulic pressure and thus, the force is acting in the cylinder to the left and right. In this regard, the force acting to the left causes the piston to slide and press the inside pad against the disc, and the force acting to the right causes the housing to slide to the right. Accordingly, the outside pad is pressed against the disc to produce frictional force along with the inside pad. When releasing the brake, restitutive force of a seal piston allows the piston to return to an original location, and disc rotation causes the inside pad to maintain a gap with the disc. At the same time, the outside pad remains spaced apart from the disc as the binding post-tensioning force is released by the sliding action of the housing, thereby eliminating the remaining torque.

A vehicle equipped with the ABS may include the sensor unit 110 attached to each wheel, and may be configured to analyze information detected from the sensor unit 110 and when one of the wheels is locked, the wheel may be pumped up to balance the four wheels. Accordingly, the vehicle is prevented from skidding, prevents steering control loss, and since the wheels are not locked, the braking distance decreases. However, mechanical reaction associated with brake control is transferred even to the pedal intact, and thus, the pedal may vibrate and generate noise. The sensor unit 110 may include a plurality of sensors each attached to each of the four front and rear wheels to detect the wheel rotation speed from a change in lines of magnetic force in the tone wheel and the sensor and input the detection results to a computer (e.g., the controller). The controller may then be configured to derive a tire air pressure based on the wheel speed obtained from the wheel sensor.

Figure 3:
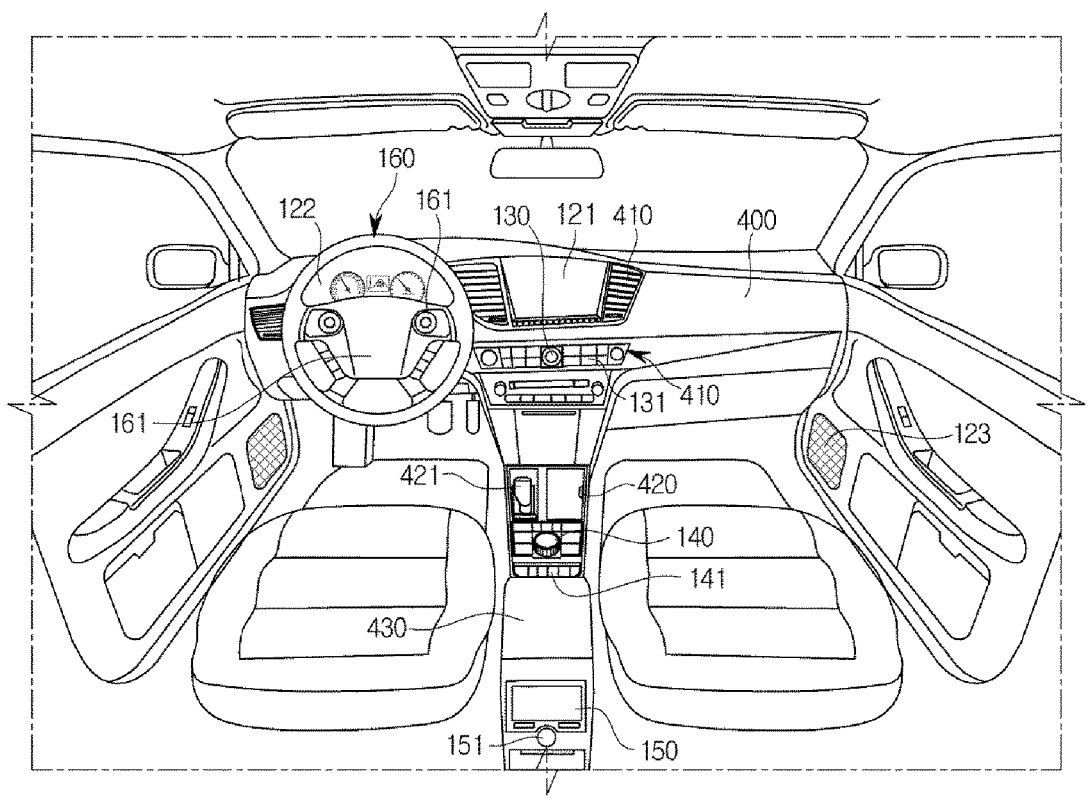
FIG. 3 shows internal features of a vehicle, according to an exemplary embodiment of the present disclosure.

FIG. 3 shows the interior of a vehicle, according to an exemplary embodiment of the present disclosure. Referring to FIG. 3, the vehicle may include a dashboard 400, a center fascia 410 that extends from the dashboard 400, a gearbox 420 installed at the bottom end of the center fascia 410, and a console box 430 installed at the back end of the gear box 420 inside the vehicle 1.

Particularly, the dashboard 400 may separate an engine room 5 from the interior space of the vehicle 1 and may include a steering wheel 160, an instrument panel 122, a ventilation duct 401, and the like installed thereon. The steering wheel 160 may be installed on the dashboard 400 near the driver seat. The steering wheel 160 may include a rim 162 to be grasped by the driver, and a spoke 161 that connects the rim 162 and a hub of the steering device of the vehicle located on the rotation axis for steering. The driver may manipulate the rim 162 to rotate the spoke 161 to change the moving direction of the wheels, thereby changing the traveling direction of the vehicle 1.

Furthermore, various input units for operating a radio system, a vehicle communication system, the instrument panel 122, or the like may be mounted on the spoke 402. For example, as shown in FIG. 3, an input unit, such as a scroll wheel, a button, a knob, a touch screen, a touch pad, a lever, a trackball, an operation sensor, or a voice recognition sensor may be mounted on the spoke 161. The instrument panel 122 may indicate traveling speed of the vehicle 1, engine revolution per minute (rpm), an amount of remaining fuel, etc. The instrument panel 122 may be generally installed on the dashboard 400 behind the steering wheel 100. In some exemplary embodiments, the instrument panel 122 may be installed in another position on the dashboard 400, on the center fascia 410, or any other location. The instrument panel 122 may include, as shown in FIG. 3, a speedometer, a tachometer that indicates the engine rpm, and a fuel gauge that indicates an amount of remaining fuel. The ventilation ducts 410 may supply air at a particular temperature to the inside of the vehicle 1 according to operation of an air conditioning system to adjust the temperature inside the vehicle 1. The ventilation ducts 410 may be installed at any location on the dashboard 400. For example, the ventilation ducts 410 may be installed on both sides to the display 121, as shown in FIG. 3.

Additionally, the display 121 may be installed on the upper frame of the dashboard 300. The display 121 may be configured to output and provide various images, such as moving images or still images to the user. The display 121 may also be configured to display information required for driving in images. For example, the display 121 may be configured to display a map around the vehicle 1 or a traveling route of the vehicle 1. Furthermore, the display 121 may be configured to display a tire pressure state along with a figure of the vehicle 1 (e.g., an illustrated drawing of the vehicle), and may be configured to output a warning signal regarding the tire pressure state. The display 121 may be, for example, a navigation device. The display 121 may include a display panel and an external housing to fix the display panel. A fixer (not shown) may be installed on the side or back of the external housing to fix the display 121 to a particular position inside the vehicle 1, e.g., onto a dashboard 400. When the display 121 is disposed on the upper part of the dashboard 400, the driver and a passenger are able to conveniently view the content on the screen of the display 121.

The center fascia 410 may be disposed between the dashboard 400 and the gear box 420. Particularly, the center fascia 410 may include at least one of a scroll wheel, a button, a knob, a touch screen, a touch pad, a lever, and a track ball for the driver or the passenger to input various instructions to operate different functions of the vehicle 1. At the bottom end of the center fascia, a gear box 420 may be provided equipped with a gear system. A gear lever 421 for gear shifting may protrude from the gear box 420. An input unit may be disposed in the gear box 420 for the driver to input various commands to operate various functions of the vehicle 1.

A console box 430 may be disposed at the back end of the gear box 420. The console box 430 may have a space to store various items therein. Moreover, a speaker 123 configured to output sounds may be mounted within the vehicle 1. Accordingly, the vehicle 1 may be configured to output a sound through the speaker 123 for performing, for example, audio, video, navigation, and other additional functions. When the tire pressure state of the vehicle 1 is beyond a reference range, a warning signal sound may be output. In addition to the internal speaker 123 configured to output sound, the vehicle 1 may include at least one or more external speakers configured to output sound to the outside to provide various sounds for pedestrians, drivers of other vehicles, etc., to recognize the vehicle 1.

Figure 4:
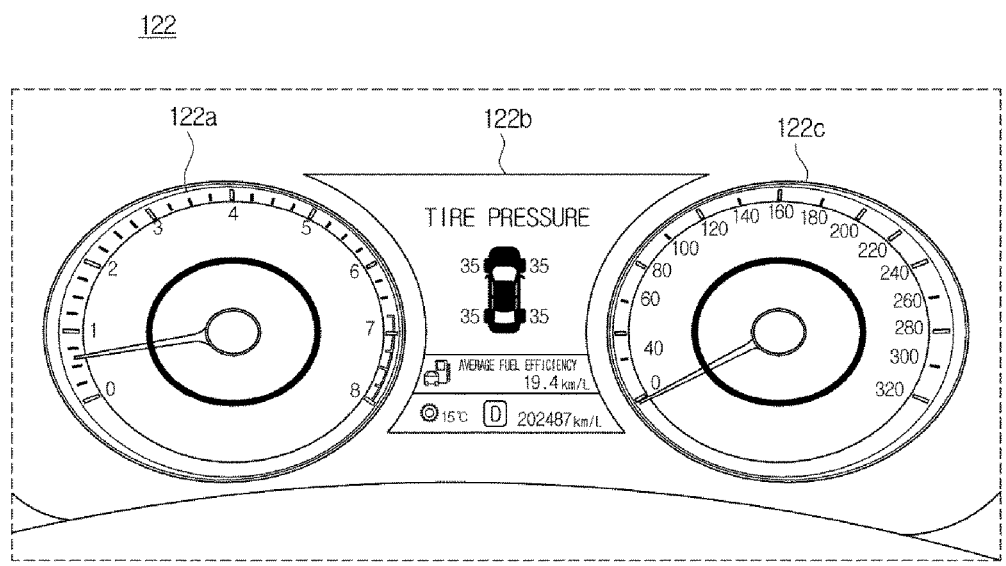
FIG. 4 shows an instrument panel of a vehicle, according to an exemplary embodiment of the present disclosure.

FIG. 4 shows an output unit, according to an exemplary embodiment of the present disclosure. Referring to FIG. 4, a cluster display 122b may be disposed on the instrument panel 122 between the speedometer 122a and the tachometer 122c of the instrument panel 122. The cluster display 122b of FIG. 4 may be configured to output a warning signal when the tire pressure state of the vehicle 1 is beyond a reference range. However, the cluster display 122b may be disposed above or below the speedometer 122a or tachometer 122c. In particular, the cluster display 122b may be disposed at any place that may be considered by the system designer for convenience of the user or design. The cluster display 122b may have curved sides to correspond to the shapes of the speedometer 122a and the tachometer 122c, as shown in FIG. 4. The form of the cluster display 122b is not, however, limited thereto. The cluster display 122b may have the form of a square, rectangle, lozenge, trapezoid, circle, oval, or other shape, depending on the choice of the system designer. The cluster display 122b may be configured to display a predetermined screen.

Further, the cluster display 122b may be configured to display various information, such as information regarding future driving of the vehicle (e.g., navigation information), information regarding current driving conditions of the vehicle, and information regarding past driving of the vehicle. For example, the cluster display 122b may be configured to display information regarding currently activated various functions, such as movable distance, average fuel efficiency, instantaneous fuel efficiency, driving time, average speed, maximum speed, navigation information, remaining distance to a destination, expected time to arrive at the destination, toll fees, cruise speed, etc., various information relating to vehicle checkup or maintenance, or various information including warning required for driving, maintenance, and repair of the vehicle 1. The cluster display 122b may also be configured to display a tire pressure state of the vehicle 1 along with a figure of the vehicle 1.

Although the tire pressure state is displayed with a top view of the vehicle 1 in FIG. 4, how to display the tire pressure state is not limited thereto. In other words, the tire pressure state may be displayed in a different manner or using a different angle view of the vehicle. Furthermore, the cluster display 122b may be configured to output a warning signal based on the tire pressure state. In an exemplary embodiment, the cluster display 122b may be configured to display different information in multiple display sections. In particular, the multiple display sections may have sizes varying by manipulation of the user or predetermined settings. The display sections may display different information.

Figure 5:
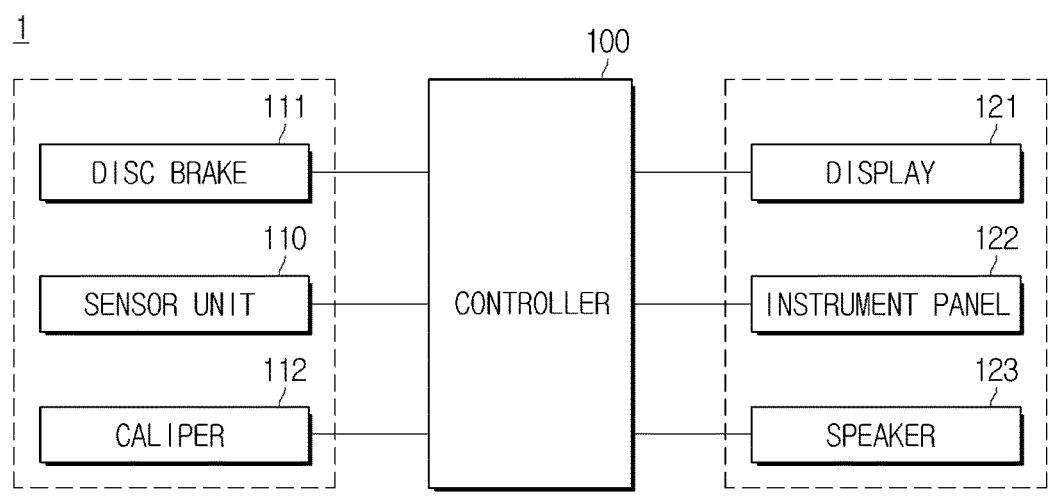
FIG. 5 is a control block diagram of a vehicle, according to an exemplary embodiment of the present disclosure.

FIG. 5 is a control block diagram of a vehicle, according to an exemplary embodiment of the present disclosure. Referring to FIG. 5, the vehicle may include a controller, a sensor unit, and an output unit. The sensor unit 110 may include a wheel sensor configured to measure wheel speed. The wheels of the vehicle may be equipped in the form of tone wheels, the speed of which may be measured by the wheel sensor. In this regard, the wheel sensor may be configured to detect a protuberant projection on the tone wheel while the tone wheel is rotating. Once the projection formed on the tone wheel passes the wheel sensor, a signal may be induced by induced electromotive force to the wheel sensor.

When the projection passes the wheel sensor, a cycle of pulse is produced. Accordingly, the wheel sensor may be configured to detect and output the number of times the projection of the tone wheel passes the wheel sensor for a predetermined period of time. The controller 100 may then be configured to derive a wheel frequency from the data acquired by the sensor unit 110. Alternatively, the wheel frequency may be derived once every predetermined reference vibration count. The controller 100 may be configured to derive relations between each derived frequency and the number of times the frequency has been derived, based on the derived frequency. The controller 100 may further be configured to derive the most frequently measured frequency based on an approximate graph, and derive tire pressure based on the derived frequency. The controller 100 may then be configured to operate the output unit to output the tire pressure derived as described above. The controller 100 may also be configured to store a proper range of tire pressure states, and output a warning signal through the output unit 120 when the derived tire pressure state is beyond the range (e.g., beyond about 44 Hz or 42 Hz).

The controller 100 may include a memory configured to store a program to perform aforementioned and following operations and related data, a processor configured to execute the program stored in the memory, a hydraulic control unit (HCU), a micro controller unit (MCU), etc. The controller 100 may be incorporated in a system on chip (SOC) embedded within the vehicle 1, and may operate under the control of the processor. In this regard, there may be not only one but multiple SoCs embedded within the vehicle 1, and the aforementioned components may not be limited to being integrated in a single SoC.

Moreover, the controller 100 may be configured to store the processed data or other data. For example, the controller 100 may be configured to store data regarding vibration counts of wheel according to the tire pressure. The controller 100 may be configured to store data regarding the vibration count of wheel, frequencies based on the speed of the vehicle 1. The controller 100 may also be configured to derive a tire pressure state by comparing the aforementioned data stored in a database with measured data.

The controller 100 may be configured to communicate with the sensor unit 110 and the output unit 120. The controller 100 may use a controller area network (CAN) of the vehicle 1 to communicate with the components. The CAN network refers to a network system used for data transmission and control between electronic control units (ECUs) of the vehicle. Specifically, the CAN network transmits data via twisted pair or shield pair wires. The CAN operates according to a multi-master principle that multiple ECUs serve as masters in master/slave systems.

In an exemplary embodiment, the controller 110 may be configured to receive wheel speed data in real time by the sensor unit and the CAN network. In addition, the controller 100 may be configured to receive detection values transmitted by the sensor unit 110 via a wired network within the vehicle, such as the vehicle's 1 local interconnect network (LIN), media oriented system transport (MOST), etc., or a wireless network, such as Bluetooth. The controller 100 may be configured to transmit output signals to the output unit 120 via the communication network. The output unit 120 may then be configured to receive data related to the tire pressure from the controller 100 and output the received data for the user to recognize it.

The output unit 120 may be implemented in the form of a display, such as liquid crystal displays (LCDs), light emitting diodes (LEDs), plasma display panels (PDPs), organic light emitting diodes (OLEDs), cathode ray tubes (CRTs), or the like. The output unit 120 may be configured to visually output the tire pressure state. Particularly, the output unit 120 may include the instrument panel 122, the display 121, and the speaker 123. The output unit 120 may thus be configured to output the information relating to the tire pressure received from the controller 100, and output a warning signal when the tire pressure state is beyond the predetermined reference range. There are no limitations on the type of the output information as long as the information may be recognized by the user.

At least one component may be added or omitted to correspond to the performance of the components of the vehicle shown in FIG. 5. Furthermore, it will be obvious to the ordinary skilled people in the art that the relative positions of the components may be changed to correspond to the system performance or structure.

Figure 6A:
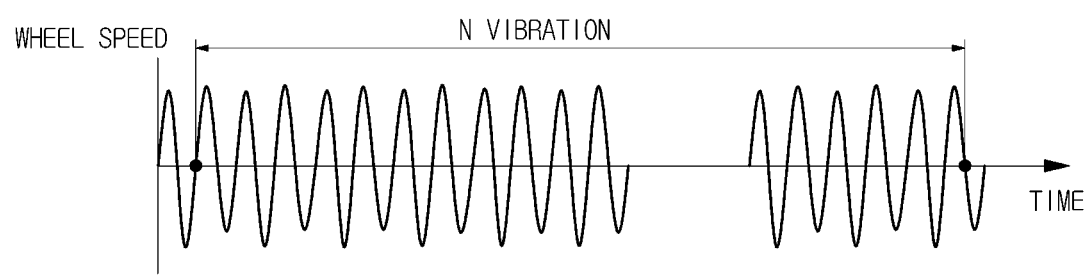
FIGS. 6A-6B show graphs of measurements of wheel speed of a vehicle, according to an exemplary embodiment of the present disclosure.
Figure 6B:
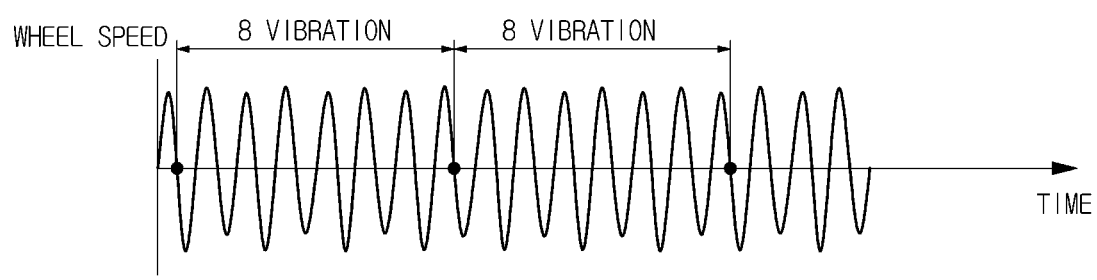

FIGS. 6A-6B show graphs of measurements of vibration counts of the tire of a vehicle, according to an exemplary embodiment of the present disclosure. Referring to FIGS. 6A-6B, the controller 100 may be configured to cancel noise contained in the measurements of wheel speed measured by the sensor unit 110 of the vehicle 1. The wheel speed measured by the sensor unit 110 may include non-periodic values, which are undesirable to the user, and thus, the controller 100 may be configured to cancel such noise to perform highly reliable calculation. The controller 100 may be configured to derive highly reliable data through interpolation based on the noise-canceled data, and derive data in a predetermined range of vibration counts using a band pass filter. Deriving data conforming to a predetermined criterion based on the measured wheel speed is obvious to the skilled people in the art, so the details will be omitted herein.

Further, the controller 100 may be configured to derive relations between time and wheel speed over time based on the data. The controller 100 may also be configured to derive a graph of wheel speed and time, and derive zero crossing points in the graph. The zero crossing points refer to points where the graph becomes zero. The controller 100 may also be configured to derive a vibration count at the wheel speed based on the zero crossing points, and derive a wheel frequency once every predetermined reference vibration count. The controller 100 may use fast Fourier transform (FFT) in deriving the frequency, without being limited thereto (see FIG. 7A). The FFT is an algorithm designed to reduce the number of calculation times in calculating discrete Fourier transform using an approximate formula based on Fourier transform, which will be obvious to the ordinary skilled people in the art, so the details will be omitted herein. The reference vibration count refers to a vibration count related to a cycle from which the wheel frequency is derived, and may be equally set for all the vehicles or may set depending on relations of weight between wheels and vehicle.

Figure 7A:
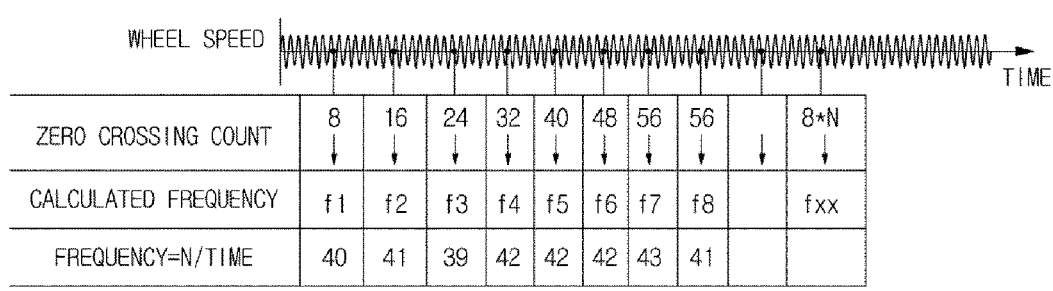
FIGS. 7A-7B show results of calculation of wheel frequencies based on wheel speed, according to an exemplary embodiment of the present disclosure.
Figure 7B:
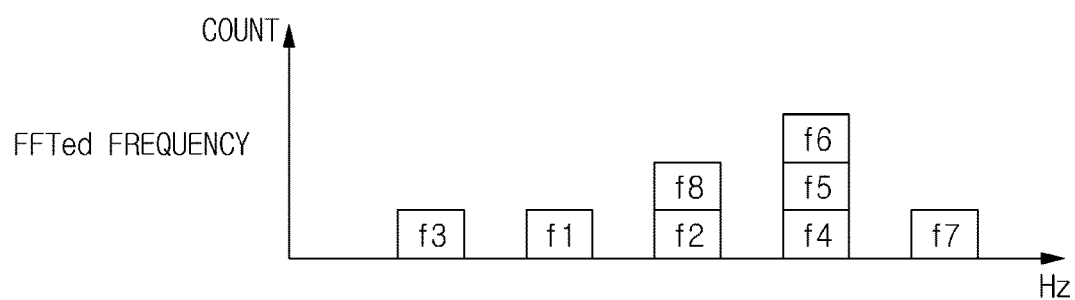

In FIG. 6B, measurement is performed with the reference vibration count set to 8. Operation of the controller 100 deriving the wheel frequency will now be described in detail. FIGS. 7A-7B show graphs representing results of calculation of frequencies based on wheel speed, according to an embodiment of the present disclosure.

FIG. 7A shows more specified values of the measurements of FIG. 6B. Similar to FIG. 6B, a frequency is output every 8 vibration counts in FIG. 7A. FIG. 7A fixes the reference vibration count for measurement to 8. In particular, since the time consumed depends on the corresponding vibration count, the frequency may be derived from the following equation 1.

$$f = \frac{N}{t} \tag{1}$$

In equation 1, f denotes a frequency, N denotes the number of times the tire vibrates, and t denotes time taken for the tire to vibrate N times. For example, for f1 of FIG.

6B, since 8 zero crossing points are measured and it takes ⅕ seconds for 8 vibrations, the frequency may be derived to be 40 Hz.

FIG. 7B represents relations between each frequency derived in FIG. 7A and the number of the derived values. In FIG. 7B, frequency values are represented on the x-axis, and since the tire frequency was formed around 40 Hz, values around 40 Hz may be determined as variables. Turning to FIG. 6C (see also FIG. 6B), there is one measurement having the value of 39 Hz, f3, one measurement having 40 Hz, f1, two measurements having 41 Hz. There are three measurements having 42 Hz, f4, f5, and f6, and one having 43 Hz, f7. Since the frequency of 42 Hz is most frequently measured in FIG. 7B, the controller 100 may be configured to determine the value of 42 Hz as a representative frequency, and derive a tire pressure state based on the representative frequency. The representative frequency refers to a most reliable frequency to be used by the controller 100 in deriving the tire pressure state. In an exemplary embodiment, the most frequently measured frequency may become the representative frequency. In other words, the controller 100 may be configured to derive a frequency in the unit of a predetermined vibration count, and relations between frequency values and the number of times the frequency is measured.

Figure 8A:
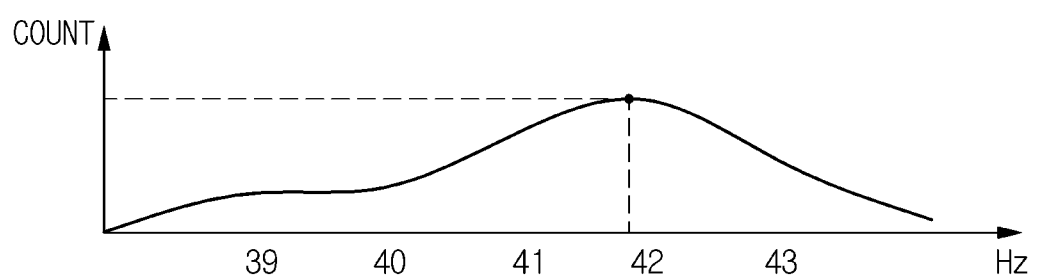
FIGS. 8A-8B show graphs of frequencies and the number of times the frequency is measured, according to an exemplary embodiment of the present disclosure.
Figure 8B:
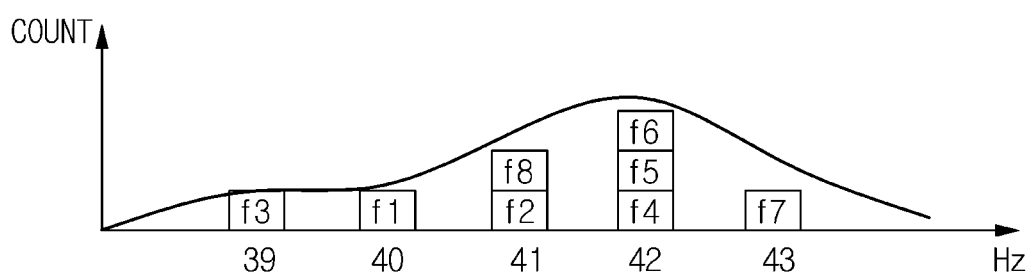
Figure 9A:
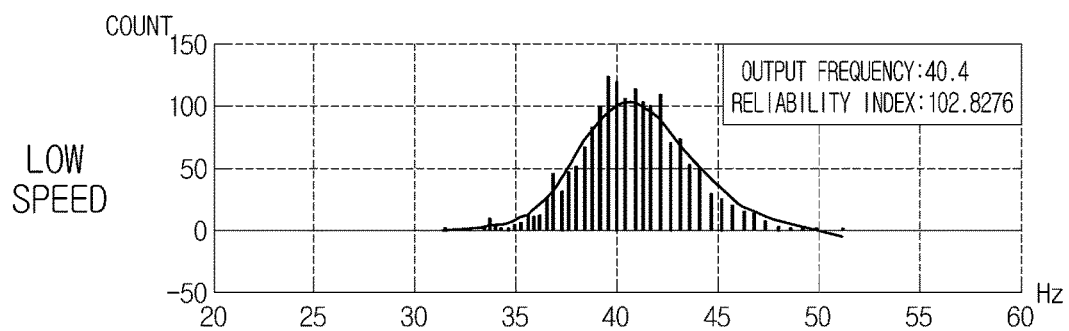
FIGS. 9A-9D show graphs of results of calculation of frequencies based on vehicle speed, according to an exemplary embodiment of the present disclosure; and A-D?
Figure 9B:
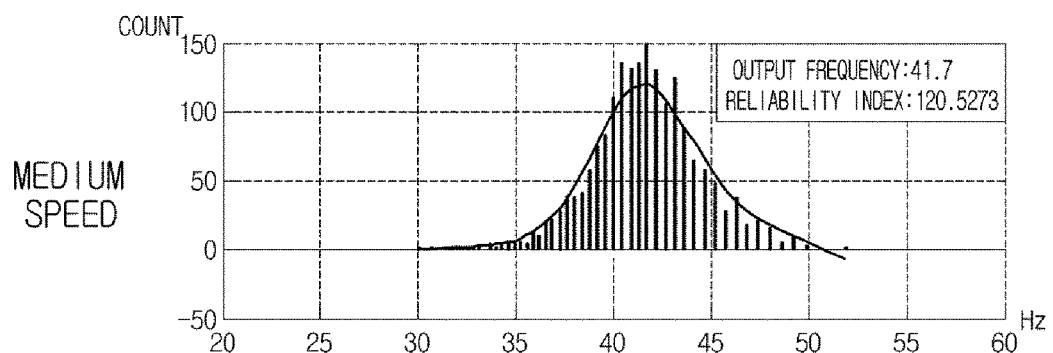
Figure 9C:
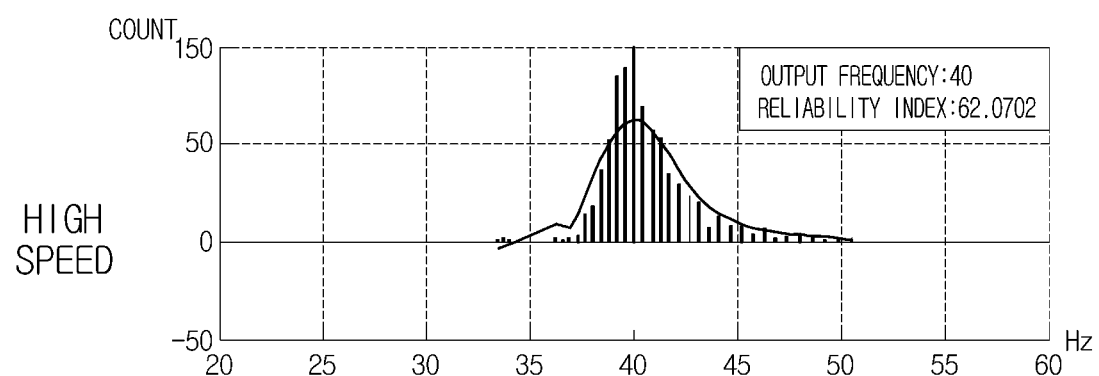
Figure 9D:
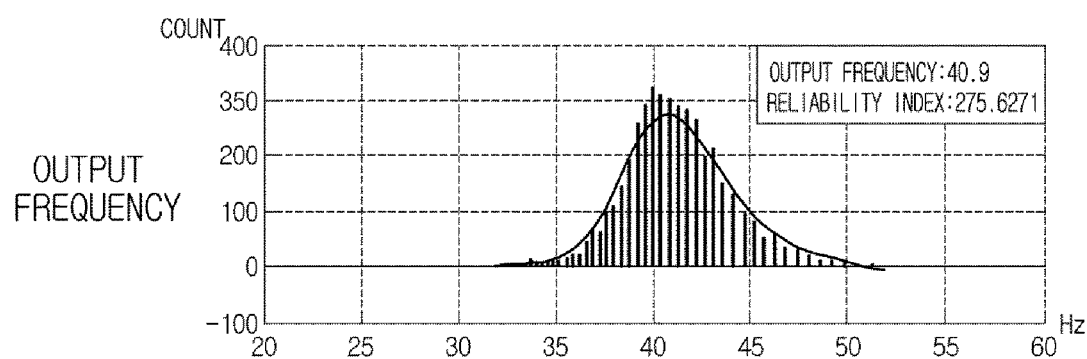

FIGS. 8A-8B are graphs derived based on the results of FIGS. 7A-7B, according to an exemplary embodiment of the present disclosure. Referring to FIG. 8A, a continuous graph is derived based on the relations derived in FIGS. 7A-7B. Deriving such a continuous graph from disconnected values may use regression analysis. The regression analysis is a method for analyzing theoretical interdependence among variables. For example, for y=f(x) that appears to be a curved line (or straight line), it is called a regression curve of y for x, and for x=g(y), it is called a regressive curve of x for y. When variables form a function of y=f(x), the functional relation is estimated by the least square method from x, y values. The least square method used in the regression analysis is to determine parameters by which the sum of differences between observed values and designed values may be minimized, and may be used in estimation, investigation, curve fitting, etc.

In other words, the method may be used to predict non-measured data by organizing the measured data, to determine the most suitable equation to represent data in a graph and estimate coefficients of the equation. The method derives a graph by calculating the sum of errors of numerical values given from the data and equation to be minimized. The method is merely by way of example to form a curve with disconnected values, without being limited thereto. The graph shown in FIG. 8A represents disconnected values based on measurements of FIGS. 7A-7B along with the curve derived through the regressive analysis. Using the graph, values in between frequencies defined as integers may be derived.

A graph shown in FIG. 8B is a graph of results of eliminating the disconnected values from the graph of FIG. 8A. Referring to FIG. 8B, the graph represents a continuous curve. In the meantime, the controller 100 may be configured to derive the most frequent frequency based on the graph of FIG. 8B and determine that the most frequent frequency is the most reliable one of the derived frequencies. In other words, the controller 100 may be configured to derive the most reliable frequency and determine a state of tire based on the following equation 2:

$$f_M = \sqrt{\frac{k}{Mu}} \quad (2)$$

Referring to equation 2, $f_M$ denotes a highly reliable frequency value derived from the above operation, and Mu denotes an unsprung mass. K denotes a value having an independent variable of the tire pressure with vertical elasticity of the tire.

The controller 100 may be configured to derive $f_M$ based on the above operation, and k may be derived from the $f_M$. The controller 100 may further be configured to learn and store a frequency of when the tire pressure is normal, and determine the tire pressure state by comparing the $f_M$ derived by the above operation and the frequency of when the tire pressure is normal. The controller 100 may then be configured to operate the output unit 120 to output information regarding the determined tire pressure state.

FIGS. 9A-9D show graphs of results of calculation of frequencies based on vehicle speed, according to an exemplary embodiment of the present disclosure. Referring to FIGS. 9A-9D, the vehicle 1 may be driven at low, medium, or high speed and have a wheel frequency varying by the vehicle speed. When the vehicle 1 is driven for a long period of time, frequencies at the low, medium, and high speed may be derived. The controller 100 may then be configured to analyze the frequency in line with each driving situation and generate a database to store the result of analysis. According to one exemplary embodiment, the low speed may be about 40 to 60 kph, the medium speed may be about 60 to 90 kph, and the high speed may be about 90 to 120 kph, but the speed range is not limited thereto.

For low speed, the controller 100 may be configured to derive the most reliable frequency to be 40.4 Hz, and for high speed, to be 40 Hz. Since frequencies of when the tire pressure is normal (e.g., within an acceptable range that does cause error) at the respective speeds may be derived, the tire state may be determined by comparison to the frequencies. However, when the vehicle 1 is driven for a short period of time, the overall frequency may be derived and determined without classifying frequencies by speed. Classification of frequencies by speed of the vehicle 1 requires more samples, and may thus be determined to be more reliable.

Figure 10:
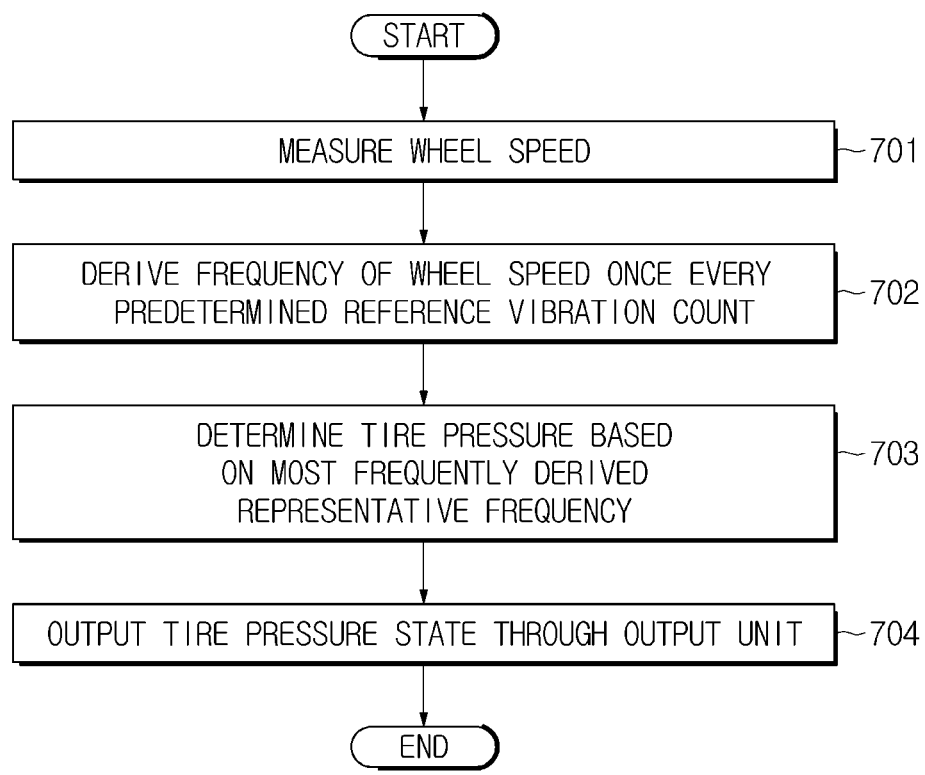
FIGS. 10 and 11 are flowcharts of a method of deriving a state of tire pressure, according to an exemplary embodiment of the present disclosure.
Figure 11:
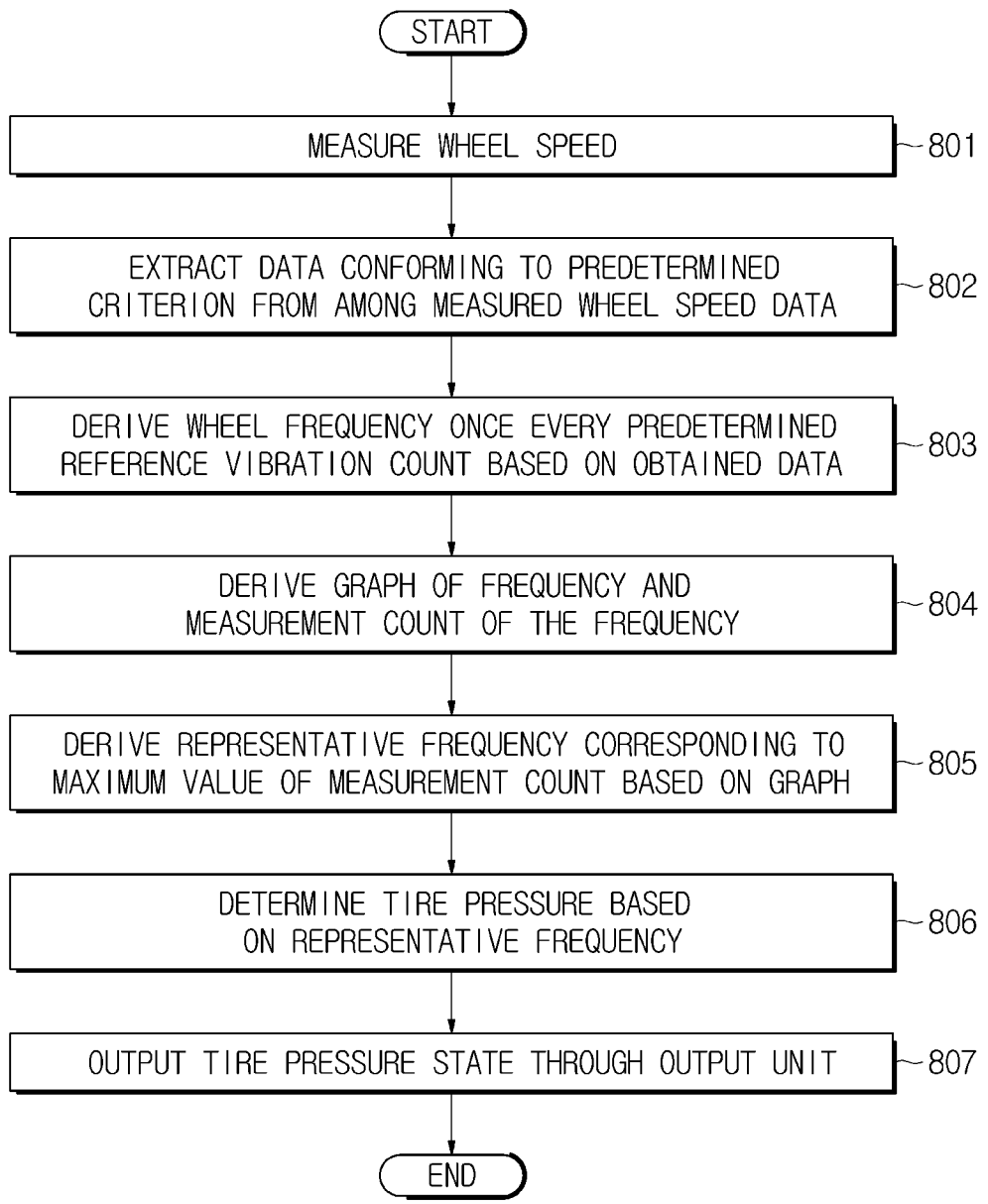

FIGS. 10 and 11 are flowcharts according to an exemplary embodiment of the present disclosure. Referring to FIG. 10, once the vehicle starts to be driven, the sensor unit 110 may be configured to measure the wheel speed, in 701. Data relating to the measured wheel speed may be transmitted to the controller 100 to derive a wheel frequency once every predetermined reference vibration count based on the data transmitted from the sensor unit 110, in 702. A tire pressure may be determined based on a frequency most frequently derived among the derived frequencies, in 703. The tire pressure determined in 703 may be output through the output unit 120 for the user to recognize the tire pressure, in 704.

FIG. 11 is a flowchart specified from what is shown in FIG. 10. Referring to FIG. 11, the sensor unit 110 may be configured to measure a wheel speed, in 801, and transmit the measured wheel speed to the controller 100. The controller 100 may be configured to receive data relating to the wheel speed and eliminate noise from the data to extract data conforming to a predetermined criterion through interpolation, in 802. Further, the controller 100 may be configured to derive a wheel frequency once every predetermined reference vibration count based on the data relating to the wheel speed, in 803. The controller 100 may also be configured to derive relations between the derived frequency and the number of times the derived frequency is measured, and further derive a graph of frequencies and the number of times the frequency is measured, in 804. From the graph, the greatest one of the numbers of times the respective frequencies are measured may be derived, in 806. The controller 100 may then be configured to determine that a frequency that corresponds to the greatest one of the numbers of times the respective frequencies are measured as the most reliable frequency. Based on the frequency derived in this way, a state of tire pressure may be derived, in 807. The controller 100 may then be configured to output the derived tire pressure through the output unit 120.

According to exemplary embodiments of the present disclosure, a vehicle and method for controlling the same may be provided to achieve more reliable tire pressure information than the existing tire pressure detecting system, by using a method of calculating a wheel frequency once every predetermined vibration count.

The exemplary embodiments of the present disclosure have thus far been described with reference to accompanying drawings. It will be obvious to people of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

DESCRIPTION OF THE SYMBOLS

1: VEHICLE
100: CONTROLLER
110: SENSOR UNIT
120: OUTPUT UNIT

What is claimed is:

1. A vehicle, comprising:
a sensor unit configured to measure a wheel speed;
a controller configured to divide a vibration count of wheel derived based on the wheel speed by a predetermined reference vibration count to calculate at least one frequency, and configured to analyze the at least one frequency to derive a state of pressure of a tire mounted on the wheel, and adjust the tire pressure state to be output; and
an output unit configured to output the tire pressure state,
wherein the controller is configured to analyze the at least one frequency to determine a representative frequency, and derive the tire pressure state based on the representative frequency, and
wherein the controller is configured to analyze the at least one frequency to generate a graph indicating how many times a frequency appears, and derive the tire pressure state based on a peak value in the graph.

2. The vehicle of claim 1, wherein the controller is configured to cancel noise from the wheel speed, extract a vibration count of the wheel in a range of predetermined vibration counts, and derive the tire pressure state based on the extracted vibration count of wheel.

3. The vehicle of claim 1, wherein the controller is configured to transform relations between the derived wheel vibration count and a measurement period of time to relations between the wheel frequency and the number of times the wheel frequency is measured based on the fast Fourier transform.

4. The vehicle of claim 1, wherein the controller is configured to collect information regarding frequency based tire pressure states to determine a pattern of wheel frequency based tire pressure states, and derive a tire pressure state that corresponds to the wheel frequency based on the pattern of the tire pressure states.

5. The vehicle of claim 1, wherein the controller is configured to store the tire pressure state and vehicle speed at which the tire pressure state is derived, which are mapped to the calculated wheel frequency data, in a database, and select and output a tire pressure state that corresponds to a wheel frequency calculated from a wheel speed based on the database.

6. The vehicle of claim 5, wherein the database divides and stores tire pressure states and preset speed ranges for the tire pressure states mapped to wheel frequency data.

7. The vehicle of claim 1, wherein the controller is configured to operate the output unit to display information regarding pressure states of a plurality of tires equipped in the vehicle.

8. The vehicle of claim 1, wherein the controller is configured to operate the output unit to output a warning signal when the tire pressure state is beyond a predetermined numerical range.

9. A method for controlling a vehicle, comprising:
measuring, by a sensor, a wheel speed;
dividing, by a controller, a vibration count of wheel derived based on the wheel speed by a predetermined reference vibration count to calculate at least one frequency;
analyzing, by the controller, the at least one frequency to derive a pressure state of a tire mounted on the wheel;
adjusting, by the controller, the tire pressure state to be output; and
outputting, by the controller, the tire pressure state,
wherein deriving a pressure state of a tire mounted on the wheel includes:
analyzing, by the controller, the at least one frequency to determine a representative frequency; and
deriving, by the controller, the tire pressure state based on the representative frequency, and
wherein deriving a pressure state of a tire mounted on the wheel includes:
analyzing, by the controller, the at least one frequency to generate a graph indicating how many times a frequency appears; and
deriving, by the controller, the tire pressure state based on a peak value in the graph.

10. The method of claim 9, wherein calculating the frequency includes:
canceling, by the controller, noise from the wheel speed;
extracting, by the controller, a vibration count of the wheel in a range of predetermined vibration counts; and
deriving, by the controller, the tire pressure state based on the extracted wheel vibration count.

11. The method of claim 9, wherein calculating the frequency includes:
transforming, by the controller, relations between the derived wheel vibration count and a measurement period of time to relations between the wheel frequency and the number of times the wheel frequency is measured based on the fast Fourier transform.

12. The method of claim 9, wherein deriving a tire pressure state includes:
collecting, by the controller, information regarding frequency based tire pressure states to determine a pattern of wheel frequency based tire pressure states; and deriving, by the controller, a tire pressure state that corresponds to the wheel frequency based on the pattern of the tire pressure states.

13. The method of claim 9, further comprising:
storing, by the controller, a database having the tire pressure state and vehicle speed at which the tire pressure state is derived, which are mapped to the calculated wheel frequency data,
wherein deriving a tire pressure state includes selecting and outputting a tire pressure state that corresponds to a wheel frequency calculated from a wheel speed based on the database.

14. The method of claim 13, wherein storing the database includes:
dividing and storing, by the controller, tire pressure states and preset speed ranges for the tire pressure states mapped to wheel frequency data.

15. The method of claim 9, wherein adjusting the tire pressure state to be output includes:
adjusting, by the controller, information regarding pressure states of a plurality of tires equipped in the vehicle to be displayed.

16. The method of claim 9, wherein outputting the tire pressure state includes:
operating, by the controller, an output unit to output a warning signal when the tire pressure state is beyond a predetermined numerical range.

* * * * *